UNITED STATES PATENT OFFICE.

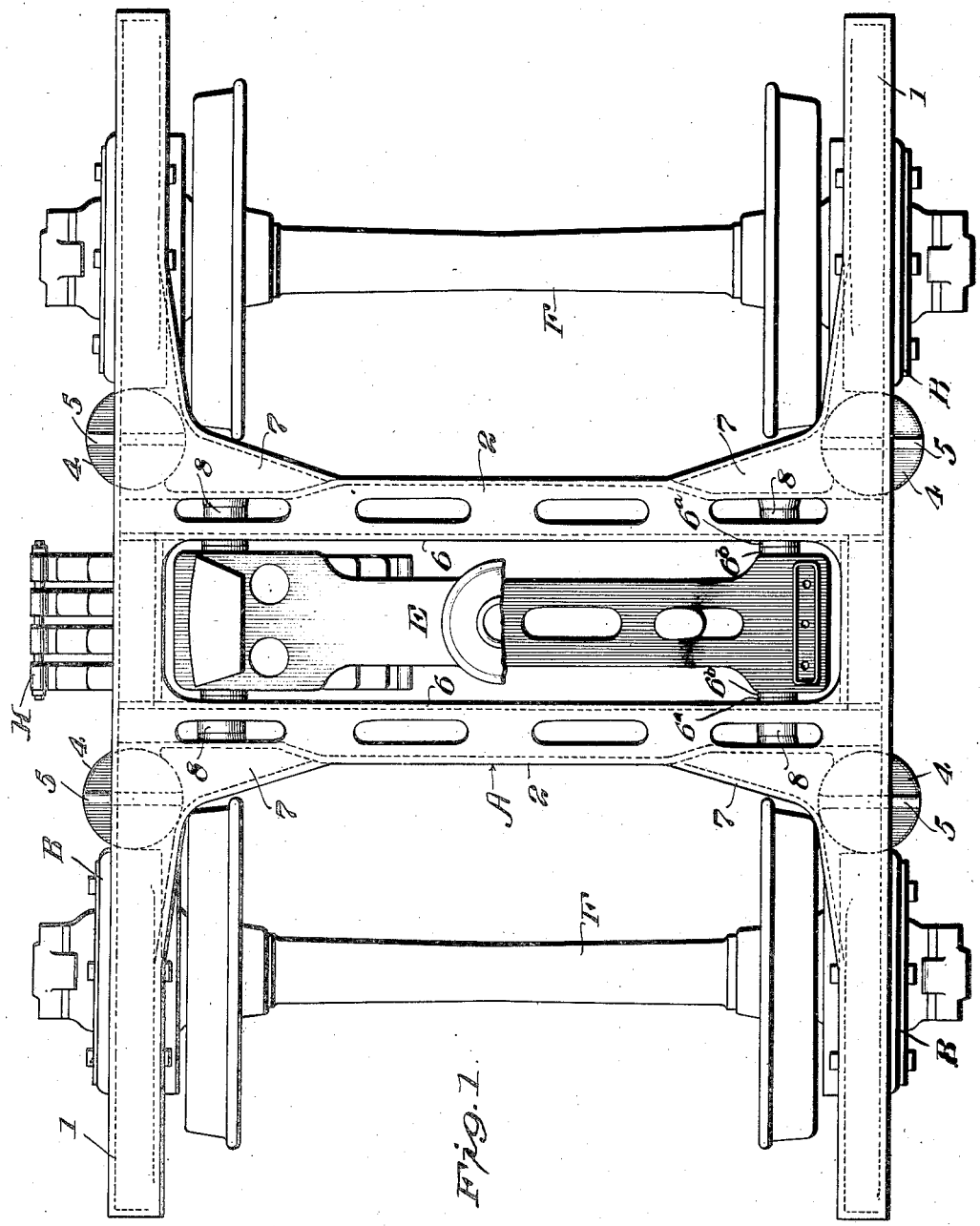

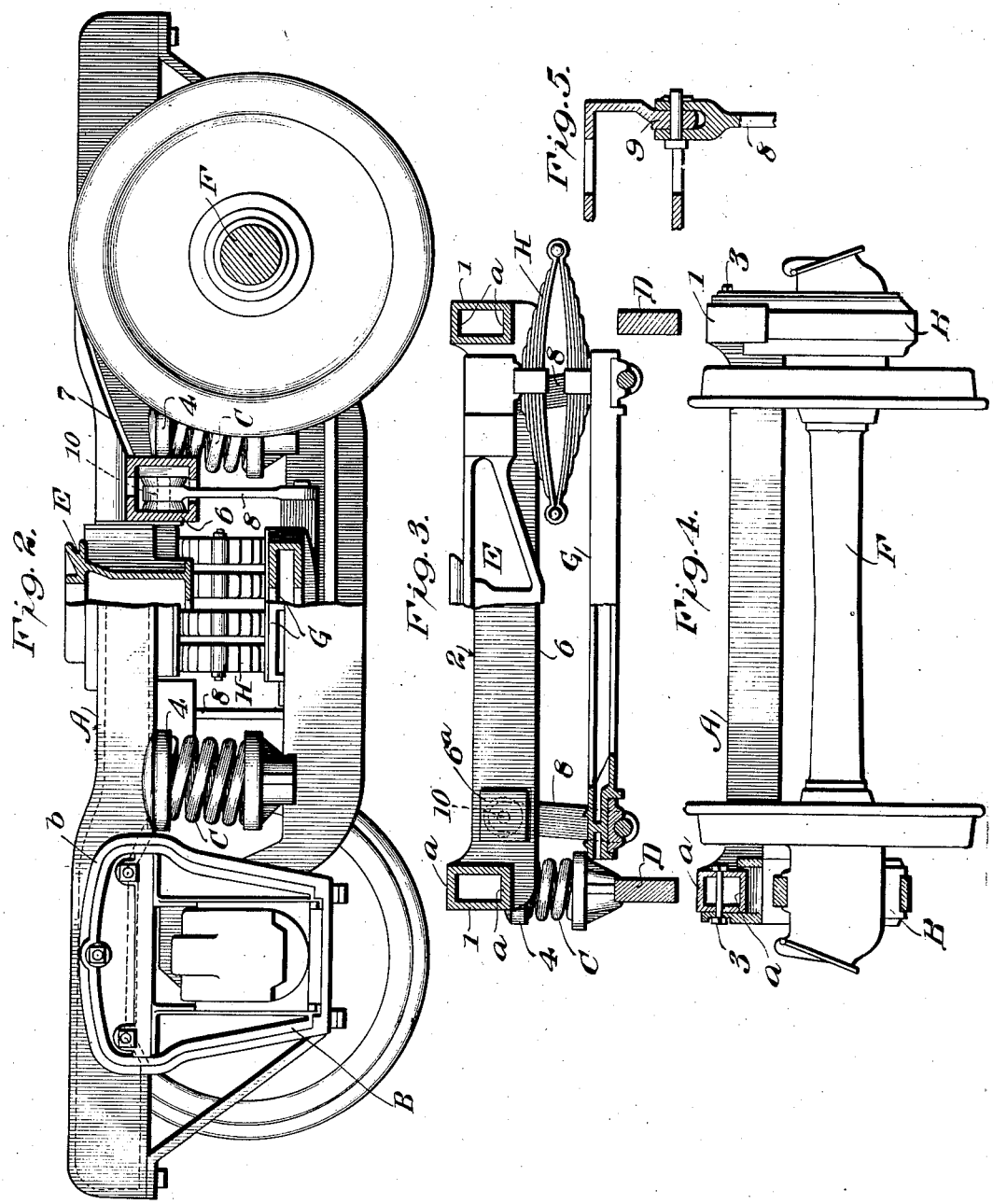

HARRY M. PFLAGER, OF ST. LOUIS, MISSOURI, ASSIGNOR TO DOUBLE BODY BOLSTER COMPANY, OF ST. LOUIS, MISSOURI, A CORPORATION OF NEW JERSEY.

TRUCK-FRAME.

1,097,819.

Specification of Letters Patent.   Patented May 26, 1914.

Application filed September 17, 1912.   Serial No. 720,854.

*To all whom it may concern:*

Be it known that I, HARRY M. PFLAGER, a citizen of the United States, residing at St. Louis, Missouri, have invented a certain new and useful Improvement in Truck-Frames, of which the following is a full, clear, and exact description, such as will enable others skilled in the art to which it appertains to make and use the same, reference being had to the accompanying drawings, forming part of this specification, in which—

Figure 1 is a top plan view, partly broken away, of a four-wheel truck frame constructed in accordance with my invention. Fig. 2 is a side elevational view and vertical, longitudinal sectional view taken on line 2—2 of Fig. 1. Fig. 3 is a vertical cross-sectional view taken on line 3—3 of Fig. 1. Fig. 4 is an end elevation and vertical cross-sectional view taken on line 4—4 of Fig. 1. Fig. 5 is a detail sectional view of a modified form of stirrup-hanger connection.

This invention relates to car trucks and has for its object to provide a four-wheel truck frame that is light, strong, inexpensive to manufacture and one which has a comparatively narrow wheel base.

Referring to the drawings which illustrate the preferred form of my invention, A designates a one-piece casting which comprises a pair of wheel pieces 1 and two single transoms 2 that connect said wheel pieces together. The wheel pieces 1 may be channel-shaped in cross section or box-shaped. The pedestals B of the truck are removable, and at the points where they are detachably connected to the wheel pieces 1, the securing bolts or rivets may pass through the vertical webs $b$ of said wheel pieces that are integrally connected to the horizontal flanges $a$, thus producing box-shaped portions which are embraced by the upper ends of the pedestals B and through which the fastening devices 3 pass, as shown in Fig. 4. By forming the wheel pieces in this manner I obtain an exceptionally strong and rigid truck frame, for the vertical webs $b$ reinforce those portions of the wheel pieces 1 which are subjected to great strains, and they also brace the pedestals and the fastening devices which secure the pedestals to the wheel pieces.

The wheel pieces 1 are provided on their undersides with integral spring seats or pockets 4 which receive the upper ends of the springs C that are interposed between the wheel pieces and the equalizers D. Said spring seats 4 are of greater diameter than the width of the horizontal brace of the wheel pieces and consequently project laterally in opposite directions from said wheel pieces, as shown in Fig. 3. The portions of said spring seats which project outwardly from the wheel pieces are reinforced and strengthened by vertical webs 5 which are integrally connected to the spring seats and to the vertical and horizontal members of the wheel pieces 1; and the portions of said spring seats which project inwardly from the wheel pieces are reinforced and strengthened by the transoms 2 through which they are integrally connected, as shown in Fig. 3. The transoms 2 are so designed and arranged that the truck is practically as strong as a truck provided with double transoms on each side of the bolster, thereby reducing the weight of the truck, the cost of manufacture and the length of the wheel base. Said transoms 2 are spaced apart from the center of the bolster E so as to locate the outer vertical web of each transom nearly mid-way between the bolster and the wheel axles F, as shown in Fig. 1, and each transom consists of a relatively narrow intermediate or central portion and two relatively wide end portions that coöperate with the end portions of the other transom and guide the bolster and prevent it from swaying. The transoms 2 may be channel-shaped in cross section, as shown in Fig. 2, comprising web and flange members, said flange members being connected to the horizontal members $a$ of the wheel pieces and the vertical webs 6 of said transoms being integrally connected at their outer ends to the vertical webs of the wheel pieces 1. I prefer to flare the top flanges of transoms 2 outwardly, as shown in Fig. 1, so as to form gussets 7 at the intersections of the top flanges of the transoms and wheel pieces.

The wide end portions of the transoms are spaced just far enough apart to receive the bolster E, and the vertical webs of the wide portions of said transoms are provided with chafing plates $6^a$, as shown in Fig. 3, that coöperate with chafing plates $6^b$ on the bolster, as shown in Fig. 1. The spring plank 8 which supports the springs H on which the bolster rests is carried by links 8 which may have bifurcated upper ends to straddle depending ears or lugs 9 on the underside of the transom 2, as shown in Fig. 5, or said links may extend up through an opening between the vertical webs of the transom 2 for engagement with the pin 10, as shown in Fig. 1.

A four-wheel truck frame of the construction above described is light in weight and is practically as strong as a cast metal truck having two transoms on each side of the bolster, for the reason that the single transoms shown, or at least the outer vertical webs thereof, are located approximately mid-way between the bolster and the wheel axles. The way in which the pedestals are connected to the wheel pieces and the manner of connecting the spring plank and supporting links to the transoms insures a structure that is exceptionally strong; and another very desirable feature of such a truck is the low cost of manufacturing the same due to the saving of metal in eliminating one pair of transoms, and also to the fact that the wheel pieces and transoms are so designed that they can be accurately fitted to the part with which they coöperate without machining.

What I claim is:

1. A four-wheel truck having a frame which comprises a single casting that consists of two wheel-pieces and two single transoms integrally connected together, the end portions of said transoms being wider than the intermediate portions of same and provided with rubbing faces which act as guides for the bolster of the truck.

2. A four-wheel truck having a frame that comprises a single casting which consists of wheel pieces and a pair of single transoms integrally connected together, the transoms being reduced intermediate their ends, and integral lugs projecting downwardly from the undersides of said transoms for supporting the links which carry the spring plank of the truck.

In testimony whereof I hereunto affix my signature in the presence of two witnesses, this 14th day of September, 1912.

H. M. PFLAGER.

Witnesses:
M. P. SMITH,
M. A. HANDEL.